United States Patent [19]

Nauta et al.

[11] 4,368,240

[45] Jan. 11, 1983

[54] HIGH GLOSS RUBBER ROLL

[75] Inventors: Jan P. Nauta; Jacob J. Kos, both of Plainville, Conn.

[73] Assignee: Nauta Roll Corporation, Kensington, Conn.

[21] Appl. No.: 287,222

[22] Filed: Jul. 27, 1981

[51] Int. Cl.$^{3}$ .......................... B32B 9/04; B05D 3/12; B05D 3/02; B05C 11/00

[52] U.S. Cl. ...................................... 428/447; 118/72; 118/107; 118/120; 118/321; 118/409; 204/25; 427/322; 427/358; 427/365; 427/366; 428/339; 428/412; 428/906; 427/387; 427/393.5

[58] Field of Search ............... 118/107, 110, 112, 113, 118/120, 72, 321, 409; 427/356, 358, 322, 387, 365, 366, 393.5; 428/339, 412, 447, 906; 204/25

[56] References Cited

U.S. PATENT DOCUMENTS

| | | | |
|---|---|---|---|
| 2,055,318 | 9/1936 | Smith . | |
| 2,213,980 | 9/1940 | Ossing . | |
| 3,304,909 | 2/1967 | Hart et al. | 118/107 X |
| 3,619,446 | 11/1971 | Nauta | 264/102 |
| 4,190,684 | 2/1980 | Berwell et al. | 427/194 |

*Primary Examiner*—Michael R. Lusignan

[57] ABSTRACT

A highly glossy skin of silicone rubber is produced on a roller body. The resultant rollers are adapted for use in the calendering of sheets and films of synthetic resinous material to produce a mirror-like finish thereon.

28 Claims, 9 Drawing Figures

HIGH GLOSS RUBBER ROLL

BACKGROUND OF THE INVENTION

In the embossing and calendaring of synthetic thermoplastic sheet and film materials, such as may be fabricated from polycarbonate, polyester, polysulfone, and like resins, it is frequently desirable to use at least one roller which has a relatively resilient surface. This serves to maintain uniform pressures across the width of the sheet material, to accommodate any slight movement of the rolls that may occur, and to compensate for variation in the thickness of the sheet material being processed, which factors become particularly significant under high speed operating conditions or when the film involved is of thin gauge. While two resiliently faced rollers may be employed in some instances, in most applications a single resilient roller will be used in combination with a rigid back-up cylinder, such as may be provided by a conventional steel roll.

There have in the past been a number of proposals for making resiliently faced rollers having appropriate surface characteristics. In one approach, a resilient roller may be polished, ground or otherwise mechanically or chemically treated to achieve the desired surface condition; however, it is found that the ultimate degree of perfection desired is seldom, if ever, achieved utilizing such a technique. In another approach, the desired surface may be developed by casting a synthetic resin coating against a female mold surface; again, however, there are very significant problems encountered in obtaining optimum uniformity in the surface thus produced, and in avoiding flow lines, mold parting lines, and the like. In accordance with Nauta U.S. Pat. No. 3,539,671, a novel and highly effective method is provided for producing rolls having a relatively resilient surface of characteristics suitable for the finishing of synthetic thermoplastic sheet material. Nevertheless, a need remains for the provision of means by which resilient rollers of mirror-like surface characteristics can be produced consistently and confidently.

Presently, rollers having extremely glossy rubber surfaces, which are used for producing a mirror-like finish on the workpiece, are typically made by a dipping method. Thus, for example, a steel roll having a ground, silicone rubber base layer is rotated through a reservoir of liquid silicone, so as to develop thereon a thin skin; if at a sufficiently high level, the surface tension of the liquid silicone will produce the desired high-gloss surface. Nevertheless, the dipping technique suffers from the serious disadvantage that a flawless surface is virtually impossible to achieve, a major imperfection being the presence of a parting line which results when the roller is removed from the reservoir of liquid silicone at the completion of the coating operation.

Accordingly, it is a primary object of the present invention to provide a novel method for the production of rollers having a relatively resilient surface of high uniformity, for use in finishing synthetic thermoplastic sheet material.

It is also an object of the invention to provide such a method which is relatively economical and convenient to carry out, and which can be used to provide rollers having highly glossy surfaces.

Another object of the invention is to provide novel apparatus by which such rollers can be produced relatively conveniently and with high levels of confidence.

A further object is to provide improved rollers having a resilient layer of uniform and virtually flawless surface characteristics, which rollers are capable of operation during extended periods of time for the finishing of synthetic thermoplastic web material.

Yet another object of the invention is to provide a novel method for the finishing of synthetic thermoplastic web material, by use of such rollers.

SUMMARY OF THE INVENTION

It has now been found that certain objects of the present invention are readily attained in apparatus for producing a skin of high uniformity and smoothness on the surface of a cylindrical roller, which apparatus includes means for supporting the roller for rotation about a substantially horizontal axes, and means for rotating the roller at a controlled rate. The apparatus also includes means for applying a liquid coating material from which the skin is to be formed, which applicator means in turn comprises a carrier, a tandem pair of blades mounted on the carrier, a follower which is also mounted on the carrier, and means for delivering the liquid coating material to the roller surface. The carrier is disposed to extend generally over the axis of rotation of the roller, and each of the blades mounted thereon is positionable adjacent the roller surface. The follower is positionable for contact on the surface so as to maintain constant spacing of the carrier therefrom, and the liquid delivering means is disposed to deliver the coating material at a point ahead of the forwardmost one of the two blades. Finally, the apparatus includes means for mounting the carrier for movement along an axis parallel to the axis of roller rotation, and means for moving the carrier at a controlled rate on the mounting means along the parallel axis. The carrier is free to pivot on the mounting means to a degree sufficient to permit maintenance of the necessary constant spacing with respect to the roller surface, as a result of which the coating material delivered to the surface of the roller is uniformly and smoothly distributed thereover by the blades during simultaneous rotation of the roller and axial movement of the carrier therealong.

In preferred embodiments of the apparatus, the carrier may comprise an offset arm member adapted to support the blades and the follower adjacent its outer end, and having at its inner end a mounting portion with a bore therethrough. The mounting means for the carrier may comprise an elongated shaft received in the bore of the carrier mounting portion, with the shaft and the bore being of complimentary circular cross-section to permit pivotal and sliding relative movement therebetween. The blades may be supported for adjustment to alter the spacing from, and angular orientation with respect to, the carrier arm, and the follower may be similarly mounted. Each of the blades will normally have a lower edge portion which is at least in part of arcuate configuration, and dimensioned and configured to conform to the surface curvature of the roller, the rearmost blade preferably having a second element of substantially rectilinear configuration merging into a curvilinear element providing the arcuate part, so as to provide a tapered gap with the surface of the roller being coated. Generally, the follower will have a contact element disposed on its lower end and adapted to afford relatively low pressure rolling contact on the roller surface.

The carrier-moving means may comprise a fixture, driven by appropriate means. A portion of the fixture may have a threaded bore extending therethrough, in which case the driving means will comprise a screw extending parallel to the axes of roller rotation and fixture movement, and passing through the threaded bore; the bore and the screw will, of course, have complementary threads to afford the necessary driving interengagement therebetween.

The apparatus will most desirably include a cleaning assembly that is independently mounted for movement along an axis that is parallel to the axis of roller rotation, and that is disposed generally thereover. The cleaning assembly will support at least one implement for cleaning the surface of the roller; it will desirably also comprise the carrier-moving means fixture, with means being provided to couple the carrier to the cleaning assembly. In such a case, the fixture may have two transversely spaced portions, each with an axial bore therethrough, with the apparatus additionally including a second elongated shaft extending parallel to the first. One of the shafts will be received in each of the bores through the fixture, and the shafts and bores will be of complementary cross-section to permit non-pivotable, sliding relative movement therebetween. In any event, the assembly is positioned for cleaning of the surface of the roller ahead of the point of liquid deposit; generally, the cleaning implement will comprise at least one brush.

Other objects of the invention are attained in a method for producing a skin of high uniformity and smoothness on the uniform outer surface of a cylindrical roller, which method includes a step of rotating a cylindrical roller at a controlled rate about a substantially horizontal axis. Tandem movement of a pair of distributor elements is effected at a controlled rate along the roller surface during its rotation, while a preselected spacing is accurately maintained between each of the distributor elements and the roller surface; both of the elements will be in close proximity to the roller, although the more forward distributor will be spaced slightly further from the surface than will be the more rearward one. A supply of liquid coating material is substantially continuously deposited upon the surface of the roller at a point ahead of the forward-most distributor element, and is uniformly distributed upon the roller surface by the elements during the relative rotational and rectilinear movement that is effected therebetween. Finally, the coating material is cured to produce a skin of high uniformity and smoothness on the roller surface.

In accordance with preferred embodiments of the method, the outer surface of the roller will be provided by a relatively hard, resiliently deformable synthetic resinous material, which is most desirably of a silicone rubber. The method may include the additional steps, carried out prior to those enumerated hereinbefore, of abrading the roller to provide the necessary uniform outer surface thereon, and of cleaning the surface to remove substantially all particles therefrom, most desirably by brushing of the surface to dislodge the particles. The liquid coating material utilized will have rheological properties which permit uniform spreading and leveling, without sagging or dripping, and will exhibit such surface tension as will produce a high degree of gloss on the surface of the cured skin; again, a liquid silicone rubber will generally be most effective.

Certain additional objects of the invention are provided by the roller produced in accordance with the foregoing method, and others are achieved by the provision of a novel method of sheet of film production utilizing such a roller. In accordance with such a method the roller is mounted on a support, in position to cooperate with a second roll body to provide a nip therebetween. A length of heated synthetic thermoplastic web material is passed through the nip between the counter-rotating rolls, so that they smooth and calender the web of material, producing the desired mirror-like surface finish thereon.

and

Figure 9:
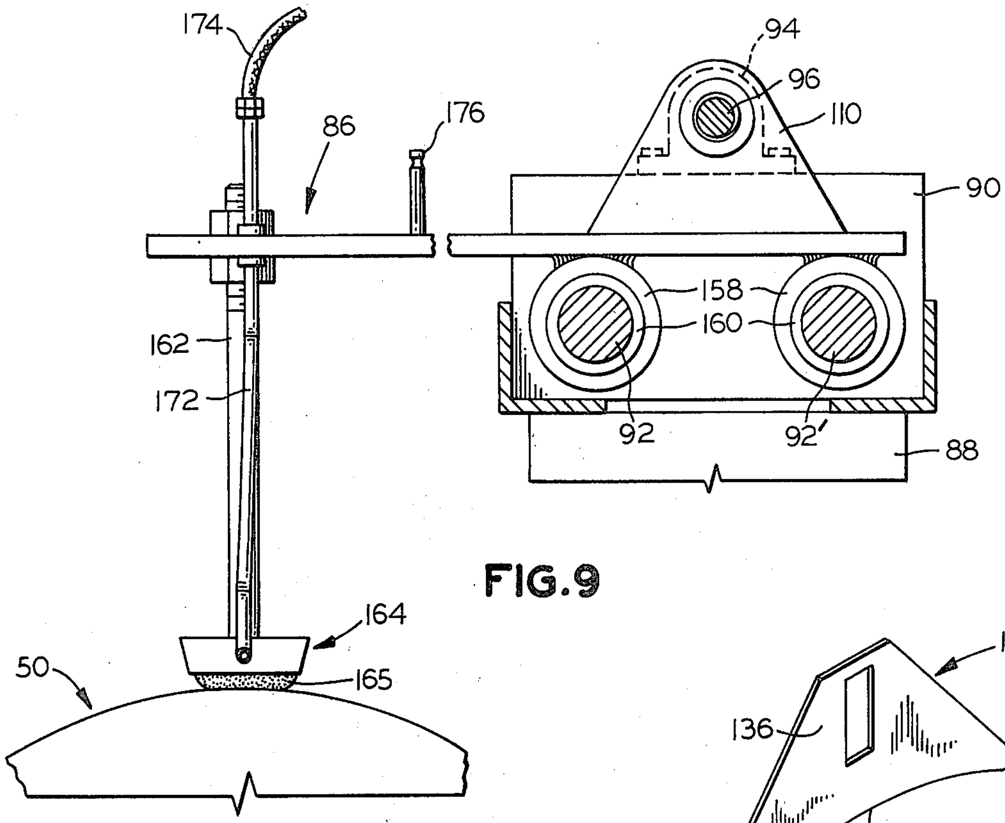
Figure 7:
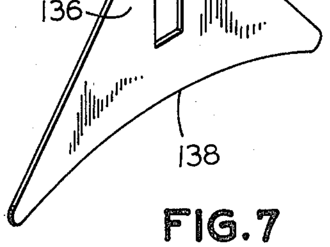
FIG. 7 is an enlarged perspective view of the more forwardly disposed distributor blade utilized in the applicator.
Figure 6:
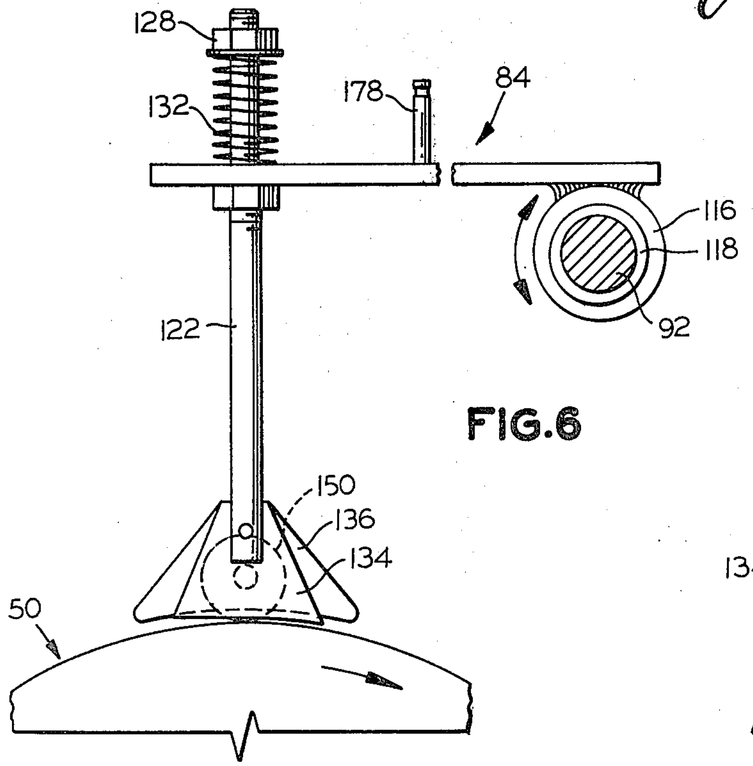
FIG. 6 is a rear fragmentary elevational view showing the applicator assembly positioned above the roller and supported by mounting means.
Figure 8:
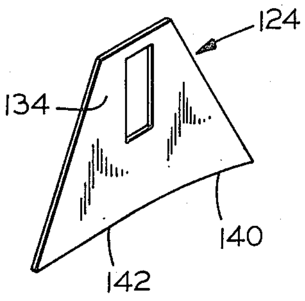
FIG. 8 is an enlarged perspective view of the more rearwardly disposed distributor blade utilized in the applicator.

FIG. 9 is a rear elevational view of the cleaning assembly, showing the brushes in contact with the surface of the roller and fragmentarily illustrating the means by which the fixture is mounted and moved within the apparatus.

DETAILED DESCRIPTION OF THE ILLUSTRATED EMBODIMENT

Figure 1:
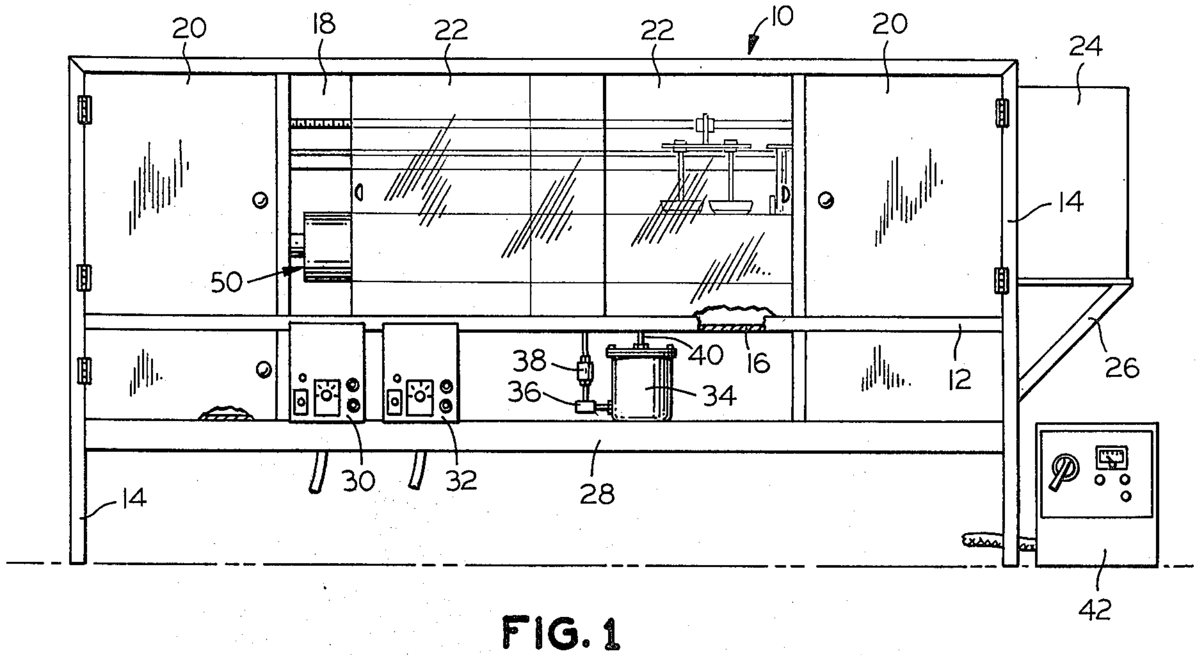
FIG. 1 is a front elevational view of a system which utilizes apparatus embodying the present invention, with one of the doors to the chamber provided thereby slightly open to partially expose the apparatus and roller situated therewithin.

Turning now in detail to FIG. 1 of the appended drawings, therein illustrated is a system which utilizes the apparatus of the invention and which includes an enclosure built upon a frame, generally designated by the numeral 10. A first horizontal frame member 12 extends between upright leg members 14 and cooperatively supports thereon a floor 16; the floor 16, a rear wall 18, and a top wall and end walls (not visible) together define five sides of a clean chamber. The sixth side of the chamber is defined by a pair of hingedly mounted end doors 20 and a pair of sliding doors 22, the latter being made of a suitable transparent material to enable the coating operations carried out within the enclosure to be monitored with all doors closed. An electrostatic precipitator unit 24 is supported upon an appropriate bracket structure 26 located adjacent one end of the enclosure, and is utilized to treat air supplied to the interior of the chamber so as to remove dust particles and other contaminants; by maintaining a slight positive pressure, the requisite level of cleanliness is ensured, even though the chamber may not be airtight.

Supported upon a second horizontal frame member 28 are two electrical control units 30, 32 which are connected to the motors that drive mechanisms included in this system, as will be more fully described hereinbelow. Also supported upon member 28 is a pressure vessel 34, which serves as a reservoir for the liquid coating resin, which flows therefrom through an appropriate flow valve 36 and filter 38 to the applicator assembly, which will also be described in greater detail hereinafter. An air pressure regulator (not shown) is in communication with the vessel 34 through a suitable tube 40, and cooperates with the flow valve 36 to control the quantity of liquid supplied to the roller body during the coating operations; the roller is generally designated by the numeral 50, and is only partially visible in this figure. The resin coating is advantageously cured thermally, and this is conveniently accomplished by passing hot water through the interior of the cylinder comprising the roller 50; a suitable unit 42 is provided to control and vary the temperature and flow rate of the water utilized for that purpose.

Figure 3:
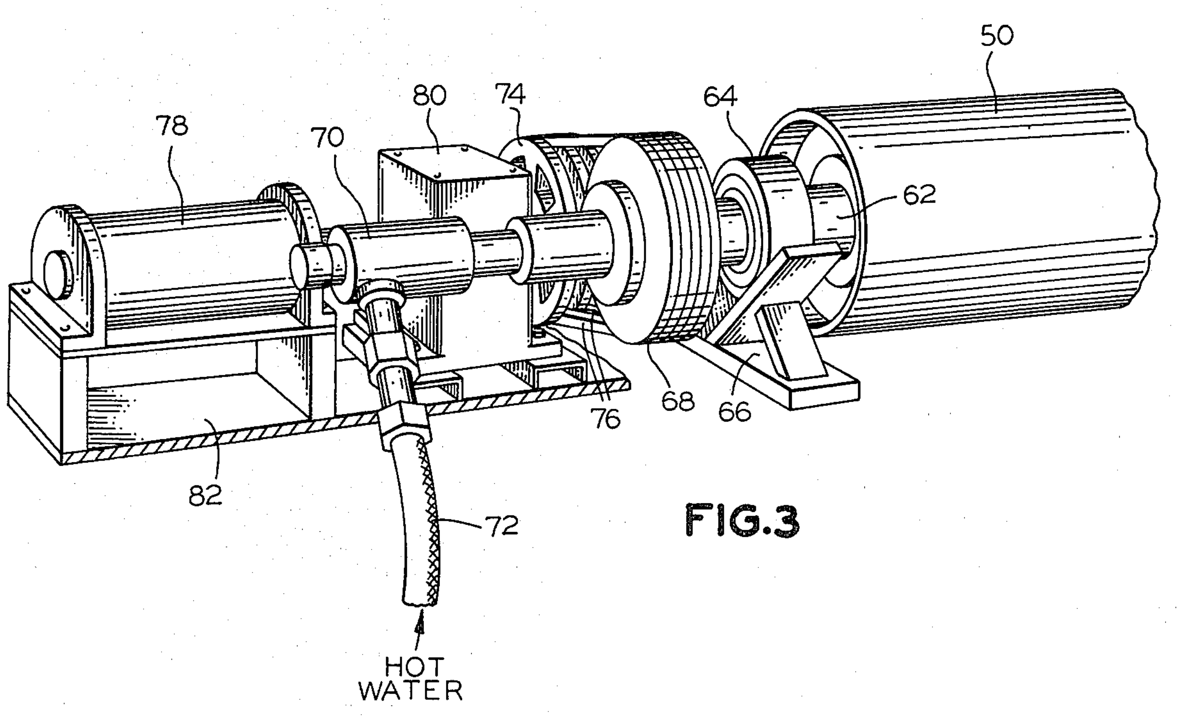
FIG. 3 is a fragmentary perspective view showing the roller-rotating drive system utilized in the apparatus of FIG. 2, drawn to a somewhat enlarged scale and showing the hot water system coupling arrangement employed therewith.
Figure 2:
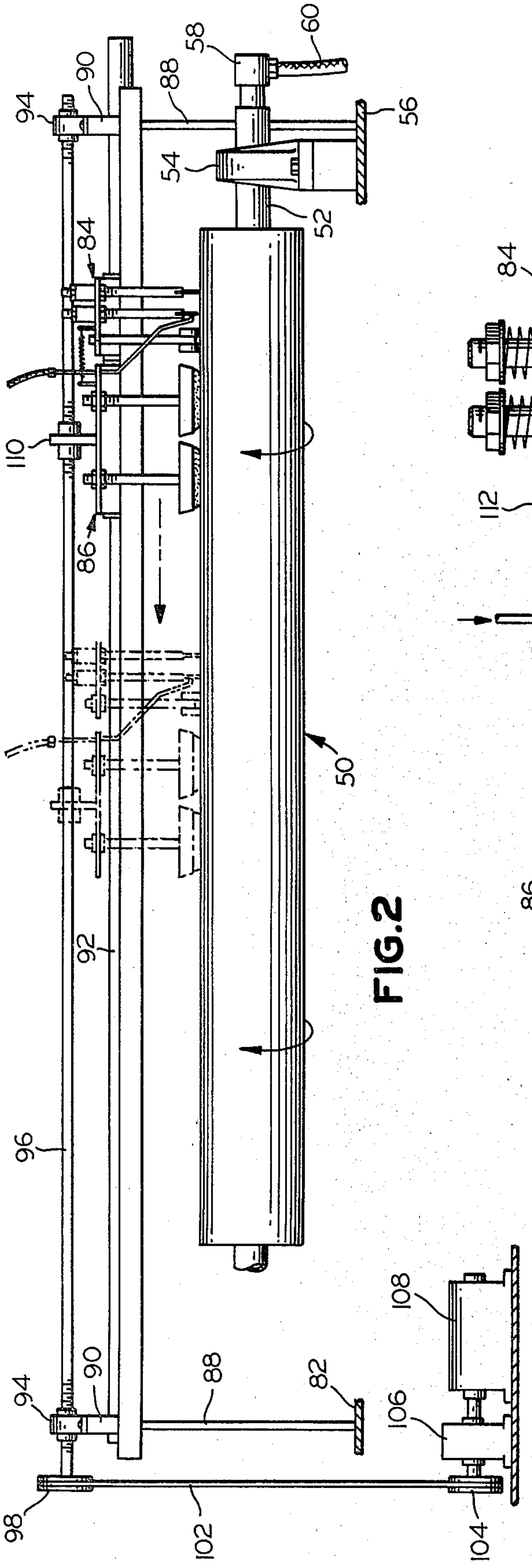
FIG. 2 is a fragmentary diagrammatical front elevational view illustrating apparatus for producing rollers in accordance with the present invention, showing a roller body mounted therein.

In FIGS. 2 and 3, the means by which the roller 50 is mounted is shown in some detail, along with other features of the apparatus. As can be seen, the roller 50 has an axially extending shaft portion 52 at one end, which is journalled within a suitable bearing block 54 which is, in turn, supported upon chassis portion 56. The outer end of the shaft portion 52 carries a union 58, to which is joined a hose 60 for discharge of water passing through the roller 50.

As seen in FIG. 3, the opposite end of the roller 50 also has an axially extending shaft portion 62, which is disposed within a bearing 64, in turn supported by a V-shaped fixture 66. A set of pulleys 68 are fixed on the shaft portion 62 outwardly of the bearing 64, and a union 70 is disposed at the outermost end thereof. Hose 72 is connected to the union 70 and to a source of hot water (not shown), to supply the heating medium for curing of the deposited resin.

Mounted for rotation adjacent the first set of pulleys 68 is a second set 74 thereof, the two sets being coupled by appropriate belts 76. The pulleys 74 are driven by a motor 78 (typically, a half-horsepower DC motor having a maximum speed of about 1800 rpm) through a gear box speed reducer 80, which generally will be capable of effecting incremental speed reduction to about 30 rpm. The motor 78 and gear box 80 are, of course, mounted upon appropriate support members which are, in turn, supported upon a second chassis portion 82.

As is most comprehensively seen in FIG. 2, mechanisms for supporting and imparting axial or translational movement to the applicator and cleaning assemblies (generally designated by the numerals 84 and 86, respectively), are provided adjacent the roller mounts. In particular, a pair of end support members 88 are secured to frame portions 56, 82 and extend upwardly therefrom to support mounting blocks 90 thereabove. Each of the blocks, in turn, supports the opposite ends of a pair of parallel rods 92, 92', only the forwardmost rod (92) being visible in this Figure. Affixed on top of each of the mounting blocks 90 is a suitable bearing mount 94, within which is received a threaded rod or screw 96. A pulley 98 is secured to one end of the screw 96, which is operatively connected by belt 102 to a cooperating pulley 104 mounted on the output shaft of a gear box speed reducer 106. The latter is driven by a second DC motor 108, which will normally have a performance rating similar to that of motor 78, but typically with a gear ratio of 100:1 rather than 50:1.

Although the applicator and cleaning assemblies 84, 86 will be described in considerable detail hereinbelow, at this point it is appropriate to note that the cleaning assembly 86 includes a flange or fixture 110 through which is provided a threaded opening to engage the screw 96. The applicator assembly 84 is resiliently and disengageably coupled to the cleaning assembly 86 by a coil spring 112. Consequently, the cleaning assembly 86 pulls the applicator assembly 84 along the length of the roller 50 when translational motion is imparted to the former through rotation of the screw 96; displaced positions of the two assemblies during such a cycle of operation are shown in plantom line.

The details of construction of the two assemblies are best illustrated in FIGS. 4–9. Concerning first the applicator assembly 84, it comprises an offset platform or arm 114, along one margin of which is welded a cylindrical mounting piece 116 having a lineal bearing 118 received therewithin. The bearing 118 has an inside diameter which corresponds to the outside diameter of the rod 92, thereby effecting close-fitting slideable and pivotable engagement thereon, with virtually no "play". Adjacting the outer margin of the arm 114 is provided a pair of apertures 120, 120', within each of which is received the shaft 122 of one of the two blade members, which are generally designated by the numerals 124, 124'. The upper end of each shaft 122 is threaded at 126, and has engaged thereon a nut 128 and an underlying washer 130. Mounted between the washer 130 and the facing surface of the arm 114, about each of the shafts 122, is a coil spring 132 which exerts an upward bias thereupon.

Attached to the lower ends of the shafts 122 of members 124 and 124' are doctor or distributor blades 134, 136, respectively. As can be seen, the blade 136 has a curvilinear or arcuate lower edge 138, which conforms closely to the curvature or radius of the roller 50; this can best be seen by reference to FIG. 6. Although the blade 134 also has a curvilinear edge element 140 corresponding to the surface of the roller, the complete lower edge is of compound configuration, including a rectilinear edge element 142 which merges into the curvilinear element 140. Again with reference to FIG. 6, it can be seen that the rectilinear edge portion 142 defines a generally tapered gap with respect to the surface of the roller 50, providing a gradual lead-in to the curvilinear element 140.

A third aperture 144 is provided adjacent the outer edge of the carrier arm 114, and has engaged therein the shaft 146 of a follower member, generally designated by the numeral 148. Rotatably mounted on the lower end of the shaft 146 is a pair of radial bearings 150 which are adapted for rolling contact on the surface of the roller 50, two bearings being provided to distribute the force and thereby avoid distortion of the roller surface. A small set screw 152 extends inwardly from the edge 154 of the arm 114 and into engagement with the shaft 146 of the follower member 148, thus enabling vertical adjustment of the position of the bearings 150. As is clear from FIGS. 4 and 6, contact of the bearings 150 on the surface of the roller 50 will maintain a preselected distance of the carrier arm 114 therefrom, in turn maintaining preset gaps under the lower edge portions of the two blades 134, 136; the gap distances can be adjusted by turning the nuts 128 on the threaded shaft ends 126.

Figure 5:
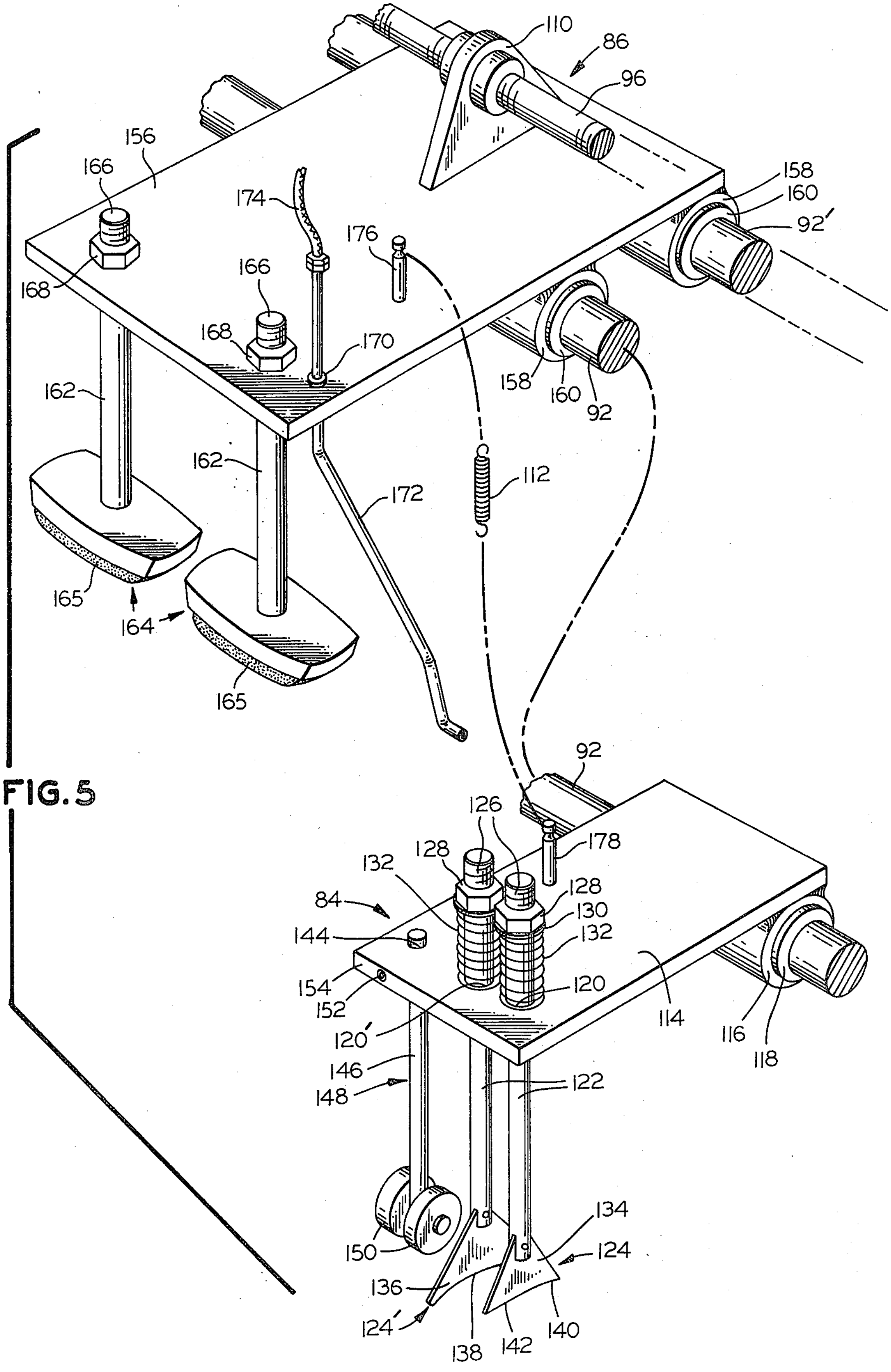
FIG. 5 is a fragmentary perspective view of the applicator and cleaning assemblies shown in FIGS. 2 and 4, drawn to a scale greatly enlarged therefrom.

The cleaning assembly 86 is shown in greatest detail in FIGS. 5 and 9, and comprises a transversely offset plate or arm 156, adjacent to the inner end of which is welded a pair of parallel cylindrical mounting pieces 158, each having a lineal bearing 160 fitted within its passageway. As in the case of the bearing 118 within the piece 116 of the carrier assembly 84, bearings 160 have inside diameters corresponding closely to the outside diameters of the shafts 92, 92′, to permit free but highly stable sliding thereon. Unlike the arm 114, however, which is free to pivot on the shaft 92, the arm 156 is mounted at two points and is thereby constrained to translational motion in a fixed plane.

Figure 4:
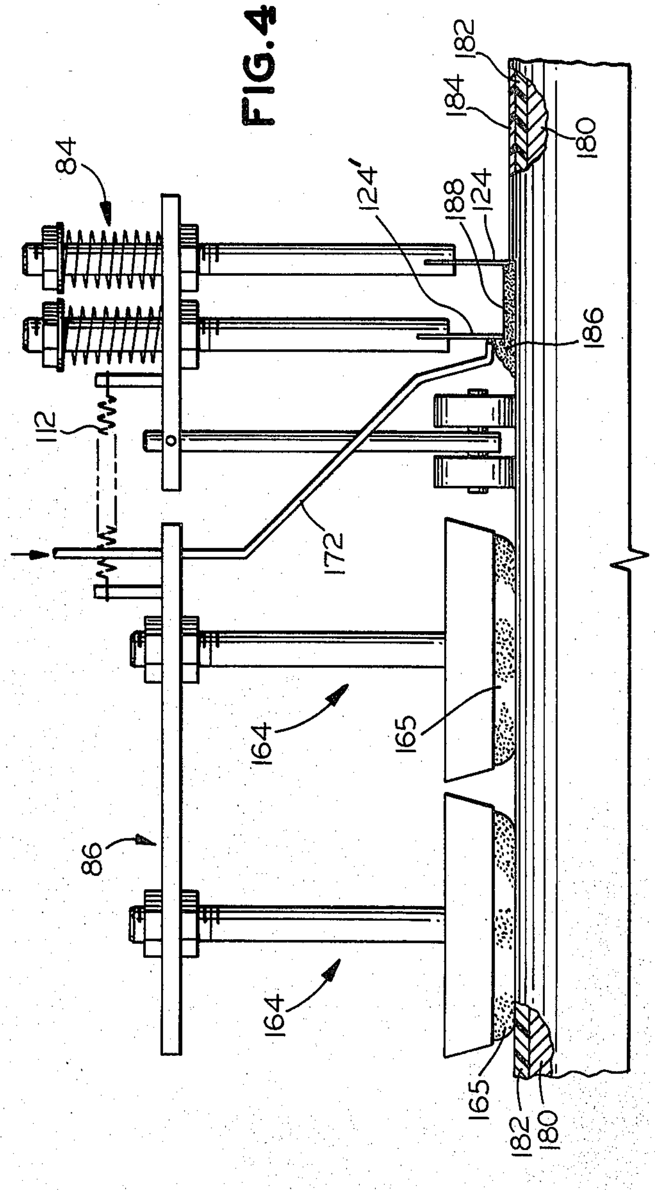
FIG. 4 is an enlarged elevational view of the applicator and cleaning assemblies utilized in the apparatus of FIG. 2.

At its outer end the arm 156 has a pair of apertures (not visible) within each of which is received the shaft 162 of a brush member, each being generally designated by the numeral 164. The upper ends of the shafts 162 are threaded at 166, and carry thereon nuts 168; thus, brush members 164 are also capable of height adjustment to properly locate the brushing elements or pads 165 thereof, or to vary the amount of pressure that they exert upon the roller 50. A third aperture (not visible) is formed adjacent one corner of the arm 156, in which is engaged a small grommet to mount delivery tube 172; the tube 172 is connected by a suitable hose 174 to the storage tank 34 for the liquid coating material. Finally, a short post 176 projects upwardly from the top surface of the arm 156, and engages one end of the coil spring 112, as seen in FIG. 4. The opposite end of the spring 112 is connected to a similar post 178 which projects upwardly from the top surface of the carrier arm 114, thus providing the coupling for the conjoint translational motion previously described.

The coating procedure employed utilizing the illustrated system is best described with particular reference to FIGS. 2 and 4. In operation, the roller body 50, comprised of a metal core 180 and a preformed rubber substrate layer or base 182 thereon, is rotated about its axis (in the direction indicated by the arrows) through driven engagement with the motor 78, as described. Simultaneously, the motor 108 rotates the screw 76 about its axis, causing the cleaning assembly 86 and, by engagement therewith, the applicator assembly 84 to move along the roller 50, on a parallel axis and in the indicated direction. The pads 165 of the brush members 164 effectively remove foreign particles from the roller surface directly ahead of the point of liquid discharge, which occurs from tube 172 at a point immediately adjacent the more forward of the blades 124. The coating material collects as a small puddle 186 in front of the blade 124, and is distributed thereby into a relatively thick collar or band 188. As the roller 50 continues to rotate and the applicator 84 continues its longitudinal progress, the thickness of the band 188 is reduced by passage under the second blade 124, so as to produce the ultimate layer of material, which is thereafter cured to the solid state to provide the final skin on the surface of the roller.

The rates of roller rotation and translation of the applicator are interdependent, and will both be dictated by other factors, primary amongst which are the nature and discharge rate of the liquid coating material employed; the ultimate determinant is, of course, the attainment of the requisite characteristics and quality in the skin produced. Nevertheless, typical rate values can be indicated, assuming a nominal roller diameter of 8 to 12 inches; specifically, the roller will generally be rotated at about 10 to 15, rpm, and the means for applying and distributing the coating resin will generally traverse the roller at a lineal rate of about 15 to 30 inches per hour. It should be appreciated that the discharge tube is mounted upon the arm of the cleaning assembly so as to ensure that any possible interference with the operation of the coating blades, that might otherwise occur, is avoided.

Control of the rate of liquid delivery to the surface of the roller is crucial to the attainment of satisfactory results, both in terms of actual mass or volume per unit of time, and also in terms of uniformity. This is not to say that adjustments cannot be made once coating has commenced; indeed, it will usually be necessarily to closely monitor the operation throughout to ensure that the deposit exhibits the requisite characteristics, and this is greatly facilitated by utilizing transparent doors or panels for the enclosure, as described above. In the illustrated system, precise control of the flow rate is achieved by balanced adjustment of the air regulator and flow value provided.

Although the apparatus may be utilized to good advantage in any instance in which it is desired to lay down a uniform layer upon the surface of a roller body, it is especially well suited to the production of surface skins that are virtually free from inperfection, and that exhibit the high gloss necessary to impart a mirror-like finish to thermoplastic sheets and films. To achieve the latter, it is imperative not only that air, dust and other particulates be removed from the surface of the roller that is to interface with the deposited skin, but also that care be taken to avoid the introduction of such contaminants during the coating and curing phases of the procedure.

A cleaning mechanism, such as the brush assembly illustrated, may be used to properly prepare the roller. One type of brush that has been found to be especially desirable provides a multitude of small bent and angularly oriented bristles (a so-called MIRACLE brush), which effectively dig into any minute pores or crevices on the surface of the roller and remove any particles lodged therein. As shown, such brushes are preferably used in tandem; although not illustrated, a vacuum device is most desirably employed in cooperation with the brushing action to remove any so-displaced particles from the vicinity of the coating operation.

To avoid introducing contamination into the system, both the air passing into the clean chamber and also the liquid coating material are desirably filtered. As indicated, an electrostatic precipitator is advantageously used to cleanse the incoming air, and a fine filter (e.g., of 5 micron pore size) may be used in the liquid delivery line; the liquid introduced into the supply tank will beneficially be prefiltered, as well as deaerated. In the latter regard it is, of course, necessary to the achievement of a flawless surface that bubbles not be present in the liquid applied.

To ensure excellent adhesion of the skin to the underlying substrate, the latter will generally not only be very lightly sanded to a matte finish, but may also be chemically or otherwise primed, and cleaned with an appropriate solution or solvent. Specific agents used for this purpose will depend upon the compositions of the substrate and the skin, and will be apparent to those skilled in the art. Suffice to say that, in those instances in which both the skin and the underlying interlayer are comprised of silicone resins, cleaning agents that are suitable for use include acetone, toluene and xylene, and a suitable primer may be the SYLGARD product made and sold for that purpose by Dow Corning Corporation.

As indicated, the top skin will normally be applied to a rubbery interlayer cast or extruded upon a polished steel roller body; the means by which such a subassembly can be produced are old in the art, and need not be discussed in detail. The interlayer should be relatively resilient, but yet tough and durable, and typically it will have a Shore A durometer value of about 65 to 72. The thickness of the base layer will depend to a large extent upon the application for which the roller is intended. For calendering operations to produce a mirror-like finish, the substrate will be about ⅛ to ¼ inch thick, with 3/16 inch being a preferred minimum. For operations such as dry lamination of films, much thicker substrates may be used, and may be on the order of a full inch or greater. Insofar as composition is concerned, while other resins such as the polyurethanes, interpolymers such as butadiene/styrene, natural rubber, and the like may be used to fabricate the rubbery substrate layer, the preferred material will generally be silicone.

While, as noted, the top skin will normally be applied to a rubbery interlayer, in some instances it may be preferable to apply the skin directly to the surface of the metal roller, which may be hardened or unhardened steel, and may or may not first have been electroplated, such as with chromium. The structure underlying the skin will, or course, influence the performance of the roller, particularly insofar as its overall hardness is significant. By utilizing, for example, a chromium plated steel base with no interlayer and a skin of silicone rubber about 10 mils thick, a roller with a cumulative Shore A durometer value of about 100 can be fabricated. As will be appreciated, aside from the manner in which the underlying surface is prepared for coating, the technique employed to apply the skin will usually be the same, regardless of the structure of the base roller used.

The skin may be made of a variety of natural and synthetic rubbery polymers, but again the silicone rubbers will generally be preferred, as providing an optimal balance of rheology, surface tension and physicals, when cured. Normally, it will contribute to the hardness of the roller surface, imparting (in combination with the base layer) a Shore A value which is desirably in the range 75 to 85; a value of 80 will be ideal in many instances. Non-rubbery substances can also be used to produce the skin, such as liquid epoxy resin formulations, ceramic coating materials, and the like. Generally, the thickness of the skin will be about 5 to 25 mils; for the most preferred polycarbonate sheet, which will be about 1.0 to 40 mils thick, the skin thickness will beneficially be about 12 to 8 mils, varying in an inverse relationship, as noted.

The rheological properties of the liquid from which the skin is produced are especially important, and may be critical in certain instances. Thus, to produce a perfectly smooth and glossy surface, the actual and apparent (i.e., under the shear forces developed) viscosities of the liquid must be such that it will deposit and be distributed evenly over the surface of the roller, will flow-out or level smoothly, to obscure flow lines produced during application and/or distribution, and will do so without dripping, sagging or distortion due to its own mass. The curing properties of the resin are also important, since it must neither set-up prematurely nor require so protracted a cure time as to detract from the practicality of the method. Although materials that cure under ambient conditions may be feasible for use in certain instances, the products that cure thermally at elevated temperatures will generally be preferred as a practical matter. In some cases, it may be desirable to add a retarder to the resin to ensure that the period of curing is sufficiently long to permit ultimate surface quality to develop. In this connection, when the skin is to have a highly glossy finish it is imperative that the coating liquid used be inherently capable of producing such properties, and this is believed to be a function of surface tension. Hence, an additional primary factor to be considered in selecting the material that is to be used to produce the skin is the surface tension value that it will exhibit under the conditions of operation.

As will thus be appreciated, because of the many variables involved it is not feasible to quantify the parameters that will influence the choice of the liquid coating material; nevertheless, suitable materials will be evident to those skilled in the art, in view of the general criteria enumerated above. By way of specific example, however, one material that has been found to be especially satisfactory for the production of a highly glossy and durable surface, on a silicone rubber-coated steel roll and used for the production of mirror-like surfaces upon polycarbonate sheet, is the silicone resin sold by General Electric under the trade designation RTV 670. To impart the most desirable rheological properties to that material, however, it has been found desirable to mix it with about 5 to 15 weight percent of a reactive diluent, such as the isoparaffinic solvent sold by Exxon Chemical Company under the trade designation ISOPAR-H. Other silicone resins that may be suitable for use are available from Dow Corning Corporation under the trade designations SYLASTIC and SYLGARD, although the flow properties of these materials may not provide optimal results for some purposes. Mixtures of various resins may also be found to provide the best balance of properties for specific applications.

During application of the skin resin, the roller may be mildly heated, to provide the best coating effects. After application, heat will normally be used to effect curing of the resin, as has been indicated hereinbefore. Generally, optimal results will be obtained if an initial setting period of considerable duration is provided, followed by a period of gradual heating until the ultimate curing temperature has been achieved. For example, when a diluted RTV 670 resin is used, the coated roller may initially be held at a temperature of about 100° to 150° Fahrenheit for a period of 10 to 20 hours, to permit maximum flow-out and the development of ultimate surface qualities. Thereafter, the temperature may be raised in increments of about 25° or so every 20 to 30 minutes, until a final curing temperature of perhaps 225° to 275° has been reached, which will be maintained for an additional hour or two. Of course, the roller will be slowly rotated during the entire curing procedure, to ensure maximum uniformity in the finished structure.

An essential feature of the invention relates to the two blades used to distribute the liquid coating material over the surface of the roller. As noted previously, the first or forwardmost blade (i.e., that proximate the point of resin discharge) is spaced further from the roller surface than is the second, or more rearward, blade. This ensures uniform application, avoids turbulence, and minimizes the formation of flow lines and the like. As also noted, whereas the forward blade has a full arcuate edge that is matched to the radius of the roller, the second blade desirably has a compound edge in which only the following element matches the roller curvature, the leading edge element being rectilinear and disposed in a tangential sense relative to the roller. Such a configuration maximizes the uniformity of skin thickness, and increases the tolerance of the operation to minor deviations, such as may be introduced by any slight lack of absolute parallelism that may exist in the several axes of disposition and movement. Finally, it has been noted that the angular orientations of the distributor blades are desirably independently adjustable with respect to the axis of the roller. This is, again, to promote optimal results, which will generally be achieved with the blades angularly displaced from perpendicular (or true transverse) to the axis of rotation.

Thus, it can be seen that the present invention provides a novel, convenient and relatively economical method for the production of rollers having a relatively resilient, high gloss surface that is ideally suited for use in finishing of synthetic thermoplastic sheet material. The invention also provides a unique apparatus with which the method can be effected, a novel method for the finishing of synthetic thermoplastic sheet material using such rollers, and novel rollers, per se.

Having thus described the invention, what is claimed is:

1. Apparatus for producing a skin of high uniformity and smoothness on the surface of a cylindrical roller, comprising:

a. means for supporting the roller for rotation about a substantially horizontal axis;
b. means for rotating the roller at a controlled rate;
c. applicator means for a liquid coating material from which the skin is to be formed, said applicator means including:
   1. a carrier disposed generally over said axis of roller rotation;
   2. at least one blade member on said carrier providing a tandem pair of blades, each being positionable adjacent the surface of a roller mounted by said supporting means, at a generally transverse orientation thereto;
   3. a follower on said carrier and positionable for contact on the surface of the roller, for maintaining constant spacing of said carrier therefrom; and
   4. means for delivering a liquid coating material to the roller surface at a point ahead of the forwardmost one of said blades;
d. means for mounting said carrier for movement along an axis parallel to said axis of roller rotation, said carrier being free to pivot on said mounting means to a degree sufficient to permit maintenance of said constant spacing with respect to the roller surface; and
e. means for moving said carrier at a controlled rate on said mounting means along said parallel axis, whereby the coating material can be delivered to the surface of the roller and uniformly and smoothly distributed thereover by said blades during simultaneous rotation of the roller and axial movement of said carrier therealong.

2. The apparatus of claim 1 wherein said carrier comprises an arm member adapted to support said blade member and said follower, and having spaced therefrom a mounting portion with a bore therethrough, and wherein said mounting means for said carrier comprises an elongated shaft received in said bore of said mounting portion, said shaft and said bore being of close, complementary circular cross-section to constrain said carrier to pivotal and sliding movement on said shaft.

3. The apparatus of claim 2 wherein said blades are supported for adjustment to alter their spacing from said carrier arm.

4. The apparatus of claim 2 wherein said follower is mounted for adjustment of its spacing from said carrier arm.

5. The apparatus of claim 1 wherein each of said blades has a lower edge portion at least in part of arcuate configuration and dimensioned to conform to the surface curvature of the roller, and wherein each is mounted for adjustment of its spacing and angular orientation with respect to the roller and said axis of rotation thereof.

6. The apparatus of claim 5 wherein the most rearwardly disposed one of said blades has a lower edge portion of compound configuration, said edge portion comprising a curvilinear element providing said arcuate part, and a rectilinear element merging into said curvilinear element and defining a tapered gap in cooperation with roller surface.

7. The apparatus of claim 4 wherein said follower has on its lower end a contact element adapted to afford relatively low pressure rolling contact on the surface of the roller.

8. The apparatus of claim 1 wherein said carrier-moving means comprises a fixture, and wherein said apparatus includes means for driving said fixture.

9. The apparatus of claim 8 wherein said fixture has a portion with a threaded bore therethrough, and wherein said driving means comprises a screw extending parallel to said axes and passing through said threaded bore, the threads of said bore and said screw being complementary to one another to afford driving interengagement therebetween.

10. The apparatus of claim 8 additionally including a cleaning assembly that is independently mounted for movement along an axis parallel to said axis of roller rotation, and that is disposed generally thereover, said cleaning assembly supporting thereon said fixture and at least one implement positioned for cleaning the surface of the roller prior to the point of liquid deposit thereupon, said apparatus additionally including means for coupling said cleaning assembly to said carrier.

11. The apparatus of claim 10 wherein said implement comprises a brush.

12. The apparatus of claim 10 wherein said assembly has two transversely spaced portions each with an axial bore therethrough, and wherein said apparatus additionally includes a second elongated shaft extending parallel to said first elongated shaft, one of said shafts being received in each of said bores through said assembly, and said shafts and bores being of complementary cross-section to permit non-pivotable sliding movement of said assembly thereon.

13. In a method for producing a skin of high uniformity and smoothness on the surface of a cylindrical roller, the steps comprising:

a. rotating a cylindrical roller, having a uniform outer surface, at a controlled rate about a substantially horizontal axis;
b. effecting the tandem translational movement of a pair of distributor elements at a controlled rate along said roller surface while rotating said roller and while accurately maintaining a preselected spacing of each of said distributor elements from said roller surface, both of said elements being in close proximity to said surface with the more forward one thereof being spaced slightly further therefrom than the more rearward one thereof;

c. substantially continuously depositing upon said surface, at a point ahead of said more forward distributor element, a supply of a liquid coating material from which said skin is to be formed, said material being uniformly distributed upon said roller surface by said elements during the relative rotational and translational movement effected therebetween; and d. curing said material to produce a skin of high uniformity and smoothness on said roller surface.

14. The method of claim 13 wherein said outer surface of said roller is provided by a relatively hard, resiliently deformable synthetic resinous material.

15. The method of claim 14 wherein said resinous material is a silicone rubber.

16. The method of claim 14 wherein said method includes the prior additional steps of:

e. abrading said resinous material on said roller to at least in part produce said outer surface; and f. thereafter cleaning said surface to remove substantially all particles therefrom.

17. The method of claim 16 wherein said cleaning step comprises brushing of said surface to dislodge virtually all particles therefrom.

18. The method of claim 13 wherein said liquid coating material has rheological properties which permit uniform spreading and leveling thereof without sagging or dripping, and exhbits such surface tension as will produce high gloss in the cured skin.

19. The method of claim 18 wherein said coating material is an uncured silicone rubber.

20. The method of claim 13 wherein said liquid coating material is non-rubbery in its solid state.

21. The method of claim 13 wherein said outer surface of said roller is of metal.

22. The method of claim 21 wherein said roller comprises a steel base roll, the surface of which provides said outer surface of said roller.

23. The method of claim 22 wherein said base roll surface is electroplated to provide said outer surface.

24. As an article of manufacture, the roller produced in accordance with any of claims 13, 15, 17, 18, 19, 20, or 21.

25. In a method of making a synthetic thermoplastic web material having a smooth and uniform surface finish, the steps comprising:

a. rotating a cylindrical roller, having a uniform outer surface, at a controlled rate about a substantially horizontal axis;

b. effecting the tandem translational movement of a pair of distributor elements at a controlled rate along said roller surface while rotating said roller and while accurately maintaining a preselected spacing of each of said distributor elements from said roller surface, both of said elements being in close proximity to said surface with the more forward one thereof being spaced slightly further therefrom than the more rearward one thereof;

c. substantially continuously depositing upon said surface, at a point ahead of said more forward distributor element, a supply of a liquid coating material from which said skin is to be formed, said material being uniformly distributed upon said roller surface by said elements during the relative rotational and translational movement effected therebetween;

d. curing said material to produce a skin of high uniformity and smoothness on said roller surface;

e. rotatably mounting said roller on a support in position to cooperate with a second roll body to provide a nip therebetween;

f. counter-rotating said roller and said roll body; and g. passing a length of heated synthetic thermoplastic web material through said nip with said roller and roll body rotating to smooth and calender said web, and thereby to produce said mirror-like finish thereon.

26. The method of claim 25 wherein said liquid coating material is an uncured silicone rubber.

27. The method of claim 26 wherein said web material is a polycarbonate sheet having a thickness of about 1.0 to 40 mils, and wherein said skin is about 12 to 8 mils thick, varying inversely in relation to said sheet thickness.

28. The method of claim 25 wherein said second roll body comprises a polished steel back-up roller.

* * * * *